(12) United States Patent
Vermue et al.

(10) Patent No.: US 10,254,147 B2
(45) Date of Patent: Apr. 9, 2019

(54) UNLOADING AUTOMATION SYSTEM FOR UNLOADING CROP

(71) Applicant: CNH Industrial America LLC, New Holland, PA (US)

(72) Inventors: Koen J. J. Vermue, Poortvliet (NL); Bart M. A. Missotten, Herent (BE); Thomas Mahieu, Ypres (BE); Karel M. C. Viaene, Moorslede (BE); Dré W. J. Jongmans, Klundert (NL); Glenn Aesaert, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/467,826

(22) Filed: Mar. 23, 2017

(65) Prior Publication Data

US 2017/0276534 A1 Sep. 28, 2017

(30) Foreign Application Priority Data

Mar. 23, 2016 (BE) .................................... 2016/5203

(51) Int. Cl.
*G01F 23/292* (2006.01)
*A01D 41/127* (2006.01)
(Continued)

(52) U.S. Cl.
CPC ......... *G01F 23/292* (2013.01); *A01D 41/127* (2013.01); *A01D 43/07* (2013.01); *A01D 43/073* (2013.01); *A01D 90/02* (2013.01); *A01D 90/10* (2013.01); *G01F 23/284* (2013.01); *G01S 13/0209* (2013.01); *G01S 13/08* (2013.01);
(Continued)

(58) Field of Classification Search
CPC .... A01D 41/127; A01D 43/07; A01D 43/073; A01D 90/02; A01D 90/10; A01B 69/00; G01F 23/284; G01F 3/292; G01S 13/0209; G01S 13/08; G01S 13/867; G01S 13/876; G01S 13/931; G01S 13/765; G01S 2013/9325
See application file for complete search history.

(56) References Cited

U.S. PATENT DOCUMENTS 6,469,628 B1 * 10/2002 Richards ................. G01S 13/42
340/539.1
6,687,609 B2 2/2004 Hsiao et al.
(Continued)

FOREIGN PATENT DOCUMENTS

WO 2007057305 A1 5/2007
WO 2007122394 A1 11/2007
WO 2013087275 A1 6/2013

*Primary Examiner* — Calvin Cheung
(74) *Attorney, Agent, or Firm* — Peter K. Zacharias; Patrick M. Sheldrake

(57) ABSTRACT

An unloading automation system for unloading of harvested crop from an agricultural vehicle, such as a combine harvester, into a container. The container may be part of a vehicle container combination that is arranged to maneuver next to the agricultural vehicle in the field. The unloading automation system includes a filling degree measurement system and position measurement system, wherein the position measurement is based on UWB technology. This nonoptical technology improves measurement results in dusty environments. The filing degree measurement system and the position measurement system have at least one UWB tag or base station in common.

13 Claims, 8 Drawing Sheets

(51) Int. Cl.
  *A01D 90/02* (2006.01)
  *A01D 90/10* (2006.01)
  *G01F 23/284* (2006.01)
  *G01S 13/02* (2006.01)
  *G01S 13/08* (2006.01)
  *G01S 13/86* (2006.01)
  *G01S 13/93* (2006.01)
  *A01D 43/07* (2006.01)
  *A01D 43/073* (2006.01)
  *G01S 13/87* (2006.01)
  *A01B 69/00* (2006.01)
  *G01S 13/76* (2006.01)

(52) U.S. Cl.
  CPC .......... *G01S 13/867* (2013.01); *G01S 13/876* (2013.01); *G01S 13/931* (2013.01); *A01B 69/00* (2013.01); *G01S 13/765* (2013.01); *G01S 2013/9325* (2013.01)

(56) References Cited

U.S. PATENT DOCUMENTS

| | | | |
|---|---|---|---|
| 7,062,381 | B1 | 6/2006 | Rekow et al. |
| 7,277,784 | B2 | 10/2007 | Weiss |
| 8,234,047 | B2 | 7/2012 | Madsen et al. |
| 8,310,354 | B2 | 11/2012 | Posselius et al. |
| 8,649,940 | B2 * | 2/2014 | Bonefas ................ B62D 12/02 348/143 |
| 9,119,342 | B2 | 9/2015 | Bonefas |
| 2006/0080819 | A1 * | 4/2006 | McAllister ............ G06K 17/00 29/403.3 |
| 2009/0044505 | A1 | 2/2009 | Huster et al. |
| 2009/0051490 | A1 * | 2/2009 | Childress ............... G06K 17/00 340/5.92 |
| 2009/0099775 | A1 | 4/2009 | Mott et al. |
| 2012/0095673 | A1 | 4/2012 | Choi et al. |
| 2014/0300707 | A1 | 10/2014 | Viaene et al. |
| 2018/0068266 | A1 * | 3/2018 | Kirmani ............ G06Q 10/0833 |

* cited by examiner

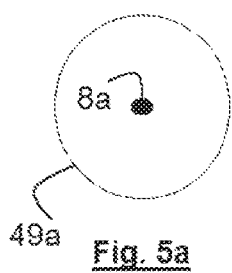
Fig. 5a
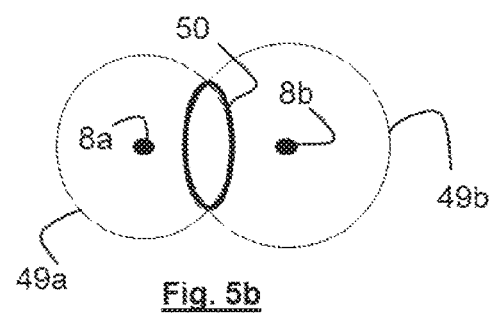
Fig. 5b
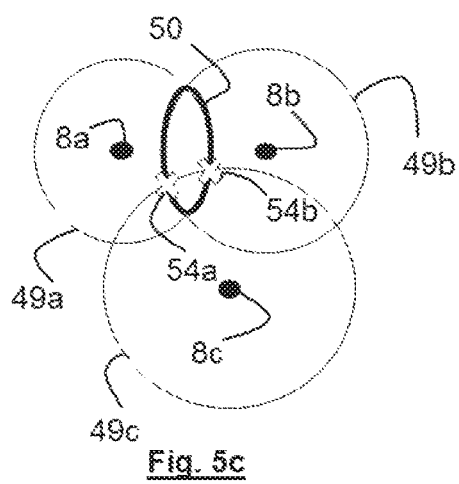
Fig. 5c
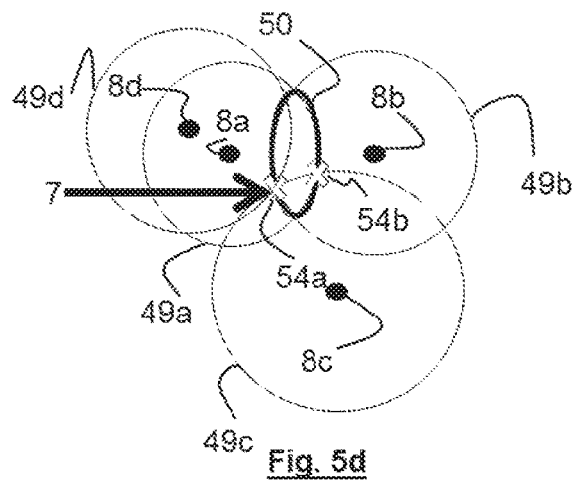
Fig. 5d
Fig. 5

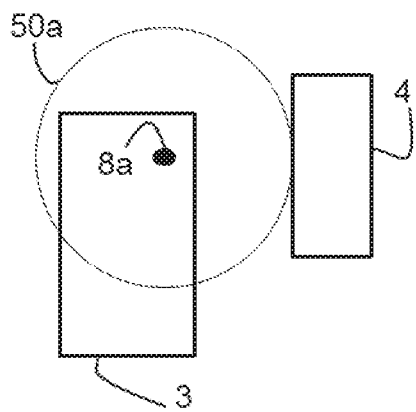
Fig. 6a
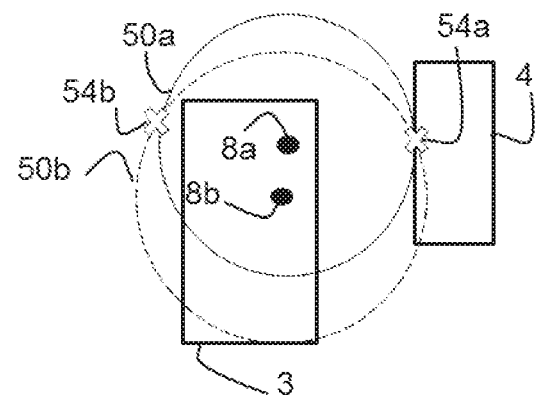
Fig. 6b
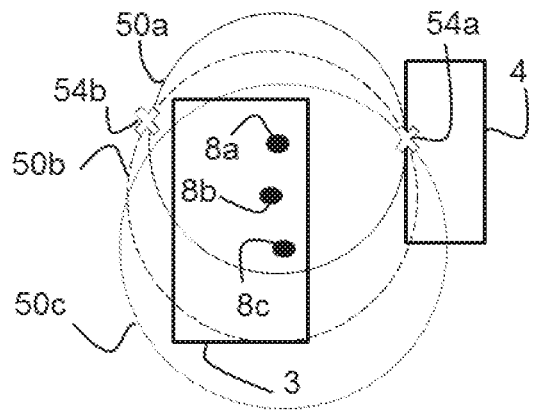
Fig. 6c
Fig. 6

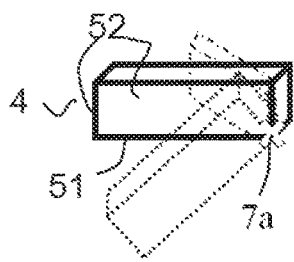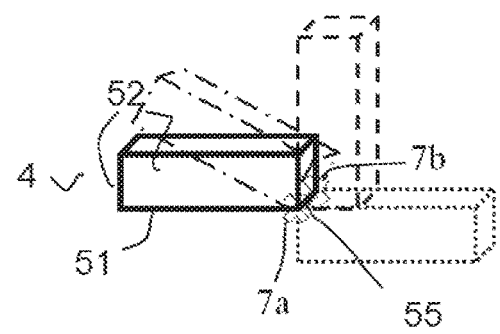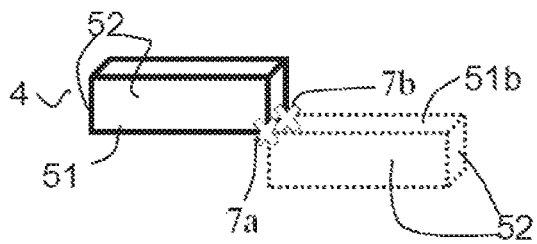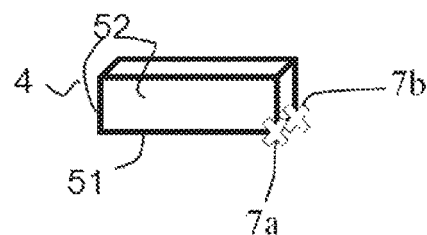
Fig. 7a  Fig. 7b  Fig. 7c  Fig. 7d
Fig. 7

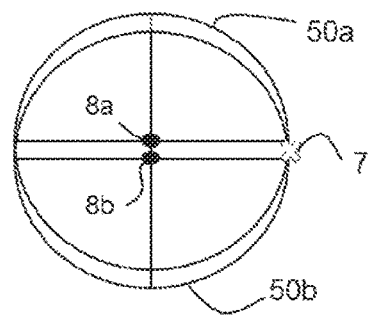
Fig. 8a
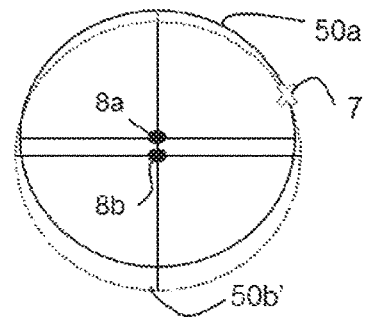
Fig. 8b
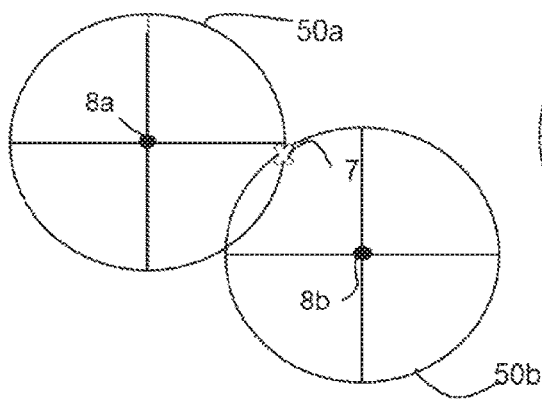
Fig. 8c
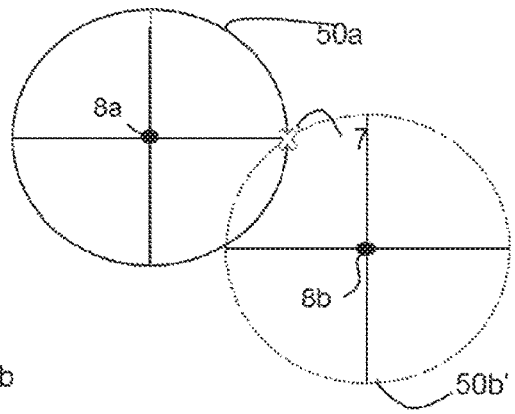
Fig. 8d
Fig. 8

UNLOADING AUTOMATION SYSTEM FOR UNLOADING CROP

CROSS REFERENCE TO RELATED APPLICATION

This application claims priority to Belgium Application No. 2016/5203 filed Mar. 23, 2016, the contents of which are incorporated herein by reference.

FIELD OF THE INVENTION

The invention relates to the field of agricultural vehicles such as combine harvesters and the unloading thereof into a container.

BACKGROUND OF THE INVENTION

An agricultural vehicle, such as an agricultural harvester, for example a combine or combine harvester, is used to harvest crop on a field. In most cases, the agricultural vehicle is equipped with a grain tank to temporarily store the harvested crop on board of the harvester. This grain tank can be unloaded into a separate container, which can be part of a vehicle container combination maneuvering next to the agricultural vehicle in the field. The operator of the agricultural vehicle is expected to continuously monitor and control multiple functionalities during harvesting, including the relative position of the container to the agricultural vehicle and the unloading into the container. To aid the operator in this task, several systems are known, such as a system comprising a 3D camera to monitor the filling degree of harvested crop in the container and the position of the container relative to the agricultural vehicle. However, this system has proven to be unreliable in dusty environments, since the crop pixels and wall pixels obtained by the 3D-camera are distorted dramatically even when only limited amount of dust was generated.

WO2007/122394, for example, proposes a locating system designed to locate one or more tags, and comprising two or more, preferably four, tag locating sensors which receive UWB (ultra wideband) radio pulses transmitted by the tags and, based on the angle and the time difference of arrival of the UWB pulses, locate the tags fairly accurately, with the accuracy being approximately 15 cm or 6 inch.

The object of the current invention is to provide an improved unloading automation system for unloading crop from an agricultural vehicle into a container.

SUMMARY OF THE INVENTION

In accordance with the invention, the object is achieved with an unloading automation system for unloading harvested crop from an agricultural vehicle into a container, wherein the agricultural vehicle is equipped with a discharge, wherein the unloading automation system comprises:

a filling degree measurement system adapted to determine the level of harvested crop on at least one position within the container;

a position measurement system adapted to determine the position of the agricultural vehicle relative to the container comprising at least one UWB tag and at least one UWB base station, wherein the UWB tag is adapted to generate an UWB pulse and arranged to communicate with at least one UWB base station, wherein the UWB tag is fixed in a known position relative to one of the agricultural harvester or the container and the UWB base station is fixed in a known position relative to the other of the agricultural harvester or the container, wherein the distance of the UWB tag to the UWB base station is determined from the communication between the UWB tag and the UWB base station; and the position of the agricultural vehicle relative to the container is obtained from the distance of the UWB tag to the UWB base station; and the filling degree measurement system comprises at least one UWB tag and at least one UWB base station, wherein the at least one UWB tag is arranged to communicate with at least one UWB base station via a wireless communication path, wherein the at least one UWB tag and the at least one UWB base station are positioned such that their wireless communication path gets distorted as the container is filled, resulting in a weakened UWB pulse received by the UWB base station. The position measurement system and the filing degree measurement system have at least one UWB tag or UWB base station in common.

To improve the measurements in dusty environments, the current invention proposes a non-optical technology to determine the position of the container relative to the agricultural vehicle, in combination with a filling degree measurement system, which can be either optical or non-optical. The proposed non-optical technology to determine the position of the container is UWB technology. Combination of the filling degree measurement and the position measurement is advantageous because it reduces the number of activities the operator has to carry out simultaneously when unloading the storage tank of the agricultural harvester into a container, while operating the agricultural harvester.

The unloading automation system in accordance with the invention comprises a position measurement system and a filling degree measurement system. The unloading automation system is used on an agricultural vehicle, for example a combine harvester, to unload harvested crop, e.g. grain, corn or seed, from the agricultural vehicle into a container.

The agricultural vehicle is equipped with a discharge. This discharge is defined as the position where the harvested crop which is to be unloaded leaves the agricultural vehicle. In the example of a combine harvester, the discharge may be the end of a moveable unloading tube. The container wherein the harvested crop is unloaded may be part of a vehicle container combination, which can be arranged to maneuver next to the agricultural vehicle in the field, while the agricultural vehicle is harvesting. To store the harvested crop, the container comprises a bottom and one or multiple walls which extend upwards from the bottom of the container.

The position measurement system is adapted to determine the position of the agricultural vehicle relative to the container and comprises at least one UWB tag and at least one UWB base station. The UWB tag is fixed in a known position relative to one of the agricultural vehicle or container, for example a wall of the container, and the UWB base station is fixed in a known position relative to the other one of the agricultural vehicle or container, for example on the agricultural vehicle. It is also possible to, for example, locate the UWB base station on a wall of the container and the UWB tag on the agricultural vehicle. The UWB tag is arranged to communicate with at least one UWB base station by generating an UWB pulse, which is received by the UWB base station. The UWB pulse contains information from which the distance of the UWB tag to the UWB base station can be determined.

Since the positions of the UWB tag and the UWB base station are fixed in a known position relative to the agricultural vehicle or the container respectively, the distance of the agricultural vehicle to the container can be obtained from the distance of the UWB base station to the UWB tag. The information obtained by the position measurement system is used to position the discharge of the agricultural vehicle relative to the container, in order to minimize the loss of harvested crop which could occur when the unloading of the harvested crop next to the container. Furthermore, the information obtained by the position measurement system can be used to avoid clashes between the agricultural vehicle and the container. UWB technology is a suitable technology since it is non-optical, hence it is not influenced by possible dust. Furthermore higher accuracy can be reached with UWB technology in comparison to passive or active RFID. Adapting existing containers to be suitable for the unloading automation system in accordance with the invention can be done at relatively low cost, since the only necessary modification is to equip the containers with UWB-tags.

The filling degree measurement system is arranged to determine the level of harvested crop at least at one position within the container the level of harvested crop. When the level of harvested crop in the container reaches a predetermined level, the unloading of harvested crop into the container can be stopped in order minimize loss of harvested crop which could occur when the container is overfilled.

By equipping an agricultural vehicle with the unloading automation system in accordance to the invention, there is no longer the need for continuous monitoring by the operator of the position of the container relative to the agricultural vehicle and/or the level of harvested crop in the container. This is particularly advantageous is dusty environments, since the dust can impede the visibility for the operator. Furthermore with regards to a smooth process and safety, it is generally desirable to minimize the responsibilities of the operator by automation.

In a possible embodiment, the technology of the UWB tag and the UWB base station may be the one described in WO 2007/122394. That is, each UWB tag may comprise an UWB radio transmitter designed to transmit UWB pulses and a microcontroller programmed to control operation of the UWB radio transmitter, and storing a unique identification code that is transmitted together with the UWB pulses to allow the tag to be identified. Similarly, the UWB base station may comprise an UWB radio receiver designed to receive UWB pulses, and a microcontroller programmed to control operation of the UWB radio receiver and to process the UWB pulses received by the UWB radio receiver to determine the distance of the UWB tag to the UWB base station.

The UWB tag and UWB base station are arranged to communicate with each other via UWB pulses. The UWB tag comprises an UWB radio transmitter designed to transmit the UWB pulses in combination with a unique identification code, such that the UWB tag can be identified. The UWB radio transmitter is controlled by a microcontroller. The UWB base station comprises an UWB radio receiver which is designed to receive the UWB pulses transmitted by the UWB radio transmitter of the UWB tag. Operation of the UWB radio receiver is controlled by a microcontroller, which processes the UWB pulses received by the UWB radio receiver as well, to determine the distance of the UWB tag to the UWB base station. The distance of the UWB tag to the UWB base station, for example, be determined by the microcontroller based on the basis of one or more of the following techniques: time difference of arrival (TDOA), angle of arrival (AOA), time of arrival (TOA) or two way ranging (TWR).

In a possible embodiment the UWB base station emits an UWB pulse, which is received by the UWB tag. After receiving the UWB pulse, the UWB tag immediately sends back an UWB pulse to the UWB base station. The distance between the UWB base station and the UWB tag can be determined from the time of flight, i.e. the time the UWB pulses have travelled. In this embodiment the both the UWB base station and the UWB tag are equipped with an UWB radio transmitter and an UWB radio receiver.

Additionally, both the UWB tag and the UWB base station may be either electrically supplied from the outside, for example by the vehicle battery of the agricultural vehicle or a vehicle container combination, or provided with an electric energy source, for example a battery.

In a possible embodiment, one of the UWB base stations is assigned as a master UWB base station which is connected to a master microcontroller, wherein all other UWB stations are arranged to communicate with the master UWB base station, wherein the microcontroller of the master UWB base station is adapted to at least process all measurements by the position measurement system. The communication between the UWB base stations can be wired or wireless.

Since the position of the UWB tag is fixed and known relative to one of the agricultural vehicle or the container and the position of the UWB base station is fixed and known relative to the other of the agricultural harvester or the container, the position of the agricultural vehicle relative to the container can be retrieved by the distance of the UWB tag relative to the UWB base station. To clarify how the position of the agricultural vehicle relative to the container is obtained and the amount of UWB tags and UWB base station required therefor, a possible general method is explained step by step below.

From the communication between a first UWB tag and a first UWB base station, the distance between the first UWB tag and the first UWB base station can be retrieved, for example by the method explained above. As an example, the first UWB tag can be placed on a predetermined position on the container and the first UWB base station can be placed on a predetermined position on the agricultural vehicle. In this example, a three dimensional coordinate system is defined with the zero of the coordinate system at the position of the first UWB base station. The distance between the first UWB base station and the first UWB tag, which can be obtained for example by the method described above, results in a first sphere with a periphery of potential positions in the three dimensional coordinate system of the first UWB tag, wherein the distance between the first UWB base station and the first UWB tag is the radius of the sphere.

By introducing a second UWB base station on a predetermined position in the three dimensional coordinate system, for example on the agricultural vehicle, the distance between the first UWB tag and the second UWB base station can be retrieved, resulting in a second sphere with a periphery of potential positions of the first UWB tag in the three dimensional coordinate system. Since the position of the first UWB tag is known to be on the peripheries of both the first and the second sphere, the intersections between the first and second sphere are the remaining potential positions of the UWB tag, resulting in a circle with a periphery of potential positions of the UWB tag. Introducing a third UWB base station on a predetermined position results in a third sphere with a periphery of potential positions of the UWB tag, wherein the third sphere intersects with the first and second sphere on two positions. Introducing a fourth UWB base station on a predetermined position results in a fourth sphere with a periphery of potential positions of the UWB tag, wherein the fourth sphere intersects with the first, second and third sphere on exactly one position, which is the position of the first UWB tag. In general without a priori knowledge, to locate a certain point in a three dimensional coordinate system, the distances of said point to four other points, of which the coordinates are known, are required.

The position of the first UWB tag can be determined by the method described above. In order to locate the discharge of the agricultural vehicle correctly, the shape of the container should be known, such that the unloaded harvested crop is unloaded in between of the walls of the container instead of for example next to the container. Therefore the position of all points of the container should be determined. Since the shape of the container is rigid and predetermined, the distance of each point of the container to the first UWB tag is predetermined. As shown by the method to locate the first UWB tag, to locate a certain point in a three dimensional coordinate system, the distance of said point to four other points, of which the coordinates are known, is required. Hence the positions of all points of the container can be determined when the positions of four points of the container is known, which can be achieved for example by placing four UWB tags on a position known and fixed relative to the container.

To reduce the cost of the unloading automation system, it is beneficial to reduce the amount of UWB tags and UWB base stations to the minimum amount required.

The minimum amount of UWB tags and UWB base stations required for the position measurement system tags can be reduced by reducing the number of degrees of freedom of the position of the agricultural vehicle relative to the container, considering the predetermined boundary conditions and/or limiting the required accuracy. Below is explained how these factors can effect the amount of required UWB tags and UWB base stations. The methods described below are examples and alternative methods are possible and not excluded from the present invention. The various methods can be used separately or in combination with each other.

If the position of the agricultural vehicle relative to the container can vary in all three dimensions of a three dimensional coordinate system, the number degrees of freedom is said to be three. If, for example, the height of the agricultural vehicle relative to the container is known beforehand, the amount of degrees of freedom is reduced to two. In that case, the first sphere with a periphery of potential positions in the three dimensional coordinate system of the first UWB tag obtained by the distance of the first UWB tag to the first UWB base station, can be reduced to a circle with a periphery of potential positions of the first UWB tag, since the points of the first sphere that are located at height different than the predetermined height can be excluded as potential positions of the first UWB tag. The second sphere with a periphery of potential positions of the first UWB tag, obtained by the distance between the first UWB tag and the second UWB base station, will then have two intersections with said circle, and the third sphere obtained by the distance between the first UWB tag and the third UWB base station, will intersect with said circle and the second sphere at exactly one position, which is the position of the UWB tag. Hence, the fourth UWB base station is no longer required to determine the exact position of the UWB tag. By reducing the number of freedoms by a certain amount, the number of required UWB base stations is decreased by the same amount.

The amount of UWB base stations may also be reduced by the aid of boundary conditions. Boundary conditions are defined as predetermined relations between certain points. For example, the container can be located on one predetermined side of the agricultural vehicle. The UWB base stations and UWB tag can then be placed on positions such that half the points on the sphere obtained by the distance between the UWB base station and an UWB tag fall on the other side of the base station than the predetermined side the container is located on relative to the agricultural vehicle, and as such can be eliminated as potential positions of the UWB tag. As such one of the points where the third sphere, obtained by the distance between the UWB tag and the third UWB base stations, intersects with the first and the second sphere, is eliminated as a potential position of the UWB tag, and only one of the two intersects remains as a potential position of the UWB tag, hence being the position of the UWB tag. As can be seen, the fourth UWB base station is no longer required.

The amount of UWB tags may be reduced by the aid of boundary conditions and/or reducing the degrees of freedom as well. For example, if the UWB tags are placed on the walls of the container and used to locate the container, certain predetermined relations can be used, such as the assumption that the container will not be upside down during unloading into the container and the predetermined shape of the container. In this example, the first UWB tag can be located on a predetermined position on a wall of the container. When the position of the first UWB tag is determined by the method described above, the position of the rest of the container is still undetermined. A second UWB tag can be introduced, as well on a wall of the container. By determining the position of the second UWB tag, the potential positions of the rest of the container can be limited as follows. An imaginary line can be drawn between the first and the second UWB tag. Since the shape of the container is known and rigid, the distance of each point of the container to the first and to the second UWB tag is known, forming a set of boundary conditions. For each point of the container, a circle with a periphery of potential positions for said point can be drawn, wherein the centerpoint of that circle is on the imaginary line between the first and second UWB tag and the radius of the circle is perpendicular to the imaginary line. The potential positions of the complete container result as it where from rotating the container around the imaginary line between the first and second UWB tag. If, for example, it can be assumed that the bottom of the container is horizontal, and the four corners are on the same height, the amount of degrees of freedom of the other points of the container relative to the UWB tags is limited to two. It is also possible to define a predetermined relation in the height of all points of the container relative to the UWB tags as a boundary condition. Both implementations reduce the potential positions of the container to two. In one of the two remaining potential positions, the container is turned upside down, which can be excluded since the this is not a realistic situation. As such the last remaining potential position is defined as the position of the container, which in this example is determined by using only 2 UWB tags.

In order to increase the accuracy of the obtained position of the UWB tag, the amount of UWB base stations can be increased. If for example five UWB base stations are used, five spheres with a periphery of potential positions for an UWB tag can be obtained. Theoretically the five spheres should all intersect at one point, being the position of the UWB tag. Due to inaccuracy in the measurements however, it is likely that the five spheres will not intersect at exactly one specific point, but rather they will all approach the position of the UWB tag within the range of the accuracy of the measurement. With five UWB base stations, the position measurement system can then be arranged to neglect an outlier, whereas in a situation with only four UWB base stations, this outlier would considerably influence the accuracy of the measurement. It is clear to the person skilled in the art that more UWB base stations will result in higher accuracy.

In order to increase accuracy, it is desirable to position UWB base stations on sufficient distance relative to each other. Since the distance between an UWB base station and an UWB tag result in a sphere or circle with a periphery of potential positions of the UWB tag, of which the UWB base station is the centerpoint, the respective spheres or circles obtained by two UWB base stations will be more similar if the UWB base stations are positioned close to each other. In this case, a small inaccuracy in the measurement can lead to a bigger inaccuracy in the determination of the intersecting points, and hence the determinations of the position of the UWB tag.

In order to reduce cost, it is beneficial to minimize to number of UWB tags and UWB base stations. If, for example, the container is fixed on a predetermined position, and the agricultural vehicle can only approach the container by one specific predetermined route, for example on rails, there is only one degree of freedom. By aid of boundary conditions that can be obtained from the predetermined route, only one UWB tag and one UWB base station are sufficient to determine the position of the agricultural vehicle relative to the container.

In a preferred embodiment, the position measurement system comprises two UWB tags and two UWB base stations. Test have shown that with this embodiment, when used on a vehicle container combination that manoeuvres next to a moving agricultural vehicle, an accuracy in the range of 10 cm or 4 inch is attainable.

In a possible embodiment, the filling degree measurement system comprises a 3D-camera, wherein the 3D-camera is arranged to scan the inside of the container. The purpose of the 3D-camera, which has a cone-like field of view, is to create a point cloud or pixel cloud of geometric samples on the surface of the subject. These pixels are used to extrapolate or reconstruct the shape of the scanned object, being the container and level of harvested crop in the container in this case. The position of the 3D-camera relative to the agricultural vehicle is known. The results of the scan provide the distance of the top of the harvested crop with respect to the 3D-camera. Since the position and height of the container relative to the agricultural vehicle is derived by the position measurement system, the level of harvested crop inside the container with respect to the container can be derived. It is also possible to include at least one wall of the container in the field of view of the 3D-camera, wherein said wall of the container can be used as a reference height for the level of crop in the container.

Besides the 3D-camera, the filling degree measurement system may comprise a source of illumination, for example a lamp. The source of illumination can be positioned separately from and/or under another angle than the 3D-camera, resulting in dissimilar fields of view of the 3D-camera and the source of illumination. Said the respective fields of view coincide in the container on the position of the to be measured harvested crop. This implementation is particularly beneficial in dusty environments, since the dust in the vicinity of the camera is not illuminated, and as such not seen by the camera. Although the dust in the container is still seen by the camera, tests have shown that this dust is less influential on the pixels obtained by the camera resulting overall in more stable crop pixels.

In a possible embodiment, the agricultural vehicle comprises an unloading tube and the 3D-camera and, if present, the source of illumination are placed on the unloading tube, possibly at least one of the 3D-camera and the source of illumination on the end of the unloading tube. The discharge of the agricultural vehicle is part of the unloading tube. If the unloading tube is moveable, the 3D-camera and the source of illumination move together with the unloading tube and can be positioned such that the position where the discharge unloads the harvested crop is seen by the 3D-camera. In this embodiment the 3D-camera is always in the correct position, since it maneuvers simultaneous with the discharge.

According to the invention, the filling degree measurement system comprises at least one UWB tag, wherein the at least one UWB tag is arranged to communicate with at least one UWB base station via a wireless communication path, for example by the method explained above. The at least one UWB tag and the at least one UWB base station are positioned such that their wireless communication path gets distorted as the container is filled, resulting in a weakened UWB pulse received by the UWB base station. A possible embodiment hereof comprises at least one UWB tag on the inside of a wall of the container and at least one UWB base station on the agricultural vehicle. Also according to the invention, at least one UWB base station and/or at least one UWB tag of the filling degree measurement system is also used in the position measurement system. As the level of harvested crop in the container rises, the harvested crop will cover the UWB tag at a certain level, resulting in a weaker UWB pulse from the UWB tag to the UWB base stations, and as such the filling degree measurement system can detect that the level of harvested crop at the position of the UWB tag exceeded the height of the UWB tag. In a further embodiment, it is possible for the filling degree measurement system to be arranged to monitor multiple positions within a container, and as such an overview of the level of harvested crop in the container can be obtained. This overview allows to continue filling of the container when the maximum level of harvested crop on one of the positions is reached. As such, more harvested crop can be stored in a certain container. In this embodiment the level of harvested crop is determined directly with respect to the container and no additional measurement or conversion for reference is required. Furthermore this embodiment is advantageous since UWB-technology is a non-optical technology, and as such not influenced by dust that may be present during harvesting. Since the UWB base station and UWB tag may be the same that comprised by the position measurement system, this embodiment can be cost efficient.

In a possible embodiment, the unloading automation system comprises a data processing device, which comprises at least one input terminal and at least one output terminal, and the data processing device comprises a processor which is adapted to compute an output data based on the input data. Additionally, the data processing device may comprise a memory to store data. The processor of the data processing device can be arranged to determine at least a desired position of the discharge of the agricultural vehicle relative to the container based on the measurements obtained by at least one of the position measurement system and the filling degree measurement system. A desired position is a position in which loss of harvested crop due to for example unloading next to the container or overfill of the container is minimized. By determining a desired position of the discharge of the agricultural vehicle, the data processing device takes over this responsibility from the operator, hence simplifying the work of the operator.

The data processing device of the unloading automation system can be implemented in various ways. The main functionality of the data processing device of the unloading automation system is to determine a desired position of the discharge of the agricultural vehicle relative to the container. Below several embodiments are explained as not limiting examples.

In a possible embodiment the input data of the data processing device of the unloading automation system comprises the signals obtained by the position measurement system and the signals obtained by the filling degree measurement system. The data processing device of the unloading automation system is arranged to process said signals to determine at least a desired position of the discharge of the agricultural vehicle relative to the container and the output data of the data processing device of the unloading automation system is said desired position of the discharge of the agricultural vehicle relative to the container. In this embodiment, the position measurement system and the filling degree measurement system are not required to comprise a separate data processing device. Instead, the unloading automation system can be equipped with only one data processing device, wherein said data processing device is arranged to process all measurements and determine a desired position of the discharge. In this embodiment the data processing device of the unloading automation system is a part of both the position measurement system and the filling degree measurement system.

In a possible embodiment the input data of the data processing device of the unloading automation system comprises the position of the agricultural vehicle relative to the container, and the level of harvested crop in the container. The position of the agricultural vehicle relative to the container is obtained by the position measurement system, and the level of harvested crop in the container is obtained by filling degree measurement system. The data processing device of the unloading automation system is arranged to determine a desired position of the discharge of the agricultural vehicle relative to the container. In this embodiment, the position measurement system and the filling degree measurement system can each comprise a separate data processor devices, or one combined data processing device.

In a possible embodiment wherein one of the UWB base stations is assigned as a master UWB base station which comprises a master microcontroller, wherein the functionalities of the data processing device of the unloading automation system are integrated in the master microcontroller. In this embodiment the data processing device of the unloading automation system can physically be the same device as the master microcontroller of the master UWB base station.

In a possible embodiment the filling degree measurement system comprises a data processing device, wherein the functionalities of the data processing device of the unloading automation system are integrated in the data processing device of the filling degree measurement system. In this embodiment the data processing device of the unloading automation system can physically be the same device as the data processing device of the level measurement system.

In a possible embodiment the container is part of a vehicle container combination, wherein the vehicle comprises a data processing device, wherein the functionalities of the data processing device of the unloading automation system are integrated in the data processing device of the vehicle container combination. In this embodiment the data processing device of the unloading automation system can physically be the same device as the data processing device of the vehicle container combination.

In a possible embodiment the agricultural vehicle comprises a data processing device, wherein the functionalities of the data processing device of the unloading automation system are integrated in the data processing device of the agricultural vehicle. In this embodiment the data processing device of the unloading automation system can physically be the same device as the data processing device of the agricultural vehicle.

In a possible embodiment the data processing device of the unloading automation system is arranged to communicate the input data and/or output data wireless.

In a possible embodiment the data processing device of the unloading automation system is arranged to communicate the input data and/or output data wired.

In a possible embodiment, the unloading automation system comprises an information system, wherein the information system is arranged to inform the operator regarding the information obtained or computed by the unloading automation system. The information system may have a similar setup to the data processing device, comprising on or more of an input terminal, an output terminal, a processor and a memory. Using the information provided by the information system, the operator is able to maneuver the position of the discharge of the agricultural vehicle relative to the container, in order to successfully unload the harvested crop into the container. The operator is no longer required to monitor the position of the container relative to the agricultural vehicle himself, nor is he required to monitor the level of harvested crop in the container.

In a possible embodiment, the information system comprises a visual display on which information obtained or computed by the unloading automation system is shown to the operator.

In a possible embodiment, the information system is arranged to produce alarms and/or instructions to the operator, wherein said alarms and/or instructions are communicated to the operator visually and/or by sound.

The data processing device may be arranged to communicate with the information system, and the information system may be arranged to inform the operator regarding the desired position.

In a possible embodiment the unloading automation system comprises a controller, wherein the controller is arranged to control the position of at least a part of at least one of the agricultural vehicle or the container relative to the other of the agricultural vehicle or the container, wherein the controller is arranged to communicate with the data processing device of the unloading automation system and wherein the controller is arranged to position the at least a part of at least one of the agricultural vehicle or the container such that the discharge of the agricultural vehicle is positioned relative to the container in the desired position determined by the data processing device.

In this embodiment, the unloading automation system comprises a controller, which can be arranged to communicate either wired or wireless with the data processing device of the unloading automation system. The controller may have a similar setup to the data processing device, comprising on or more of an input terminal, an output terminal, a processor and a memory. Additionally, the output data can comprise a drive signal, which is arranged to move at least a part of at least one of the agricultural vehicle or the container. This may be for example the unloading tube of the agricultural vehicle, the container and/or the vehicle container combination which the container may be part of. The function of the controller is to arrange the discharge of the agricultural vehicle to be located on the desired position, that is determined by the data processing device of the unloading automation system. By arranging the discharge of the agricultural vehicle to be in the desired position, the controller takes over this responsibility from the operator, hence simplifying the work of the operator. Below several embodiments are explained as not limiting examples Said controller of the unloading automation system can be implemented in various ways. The main functionality of the controller of the unloading automation system is to ensure the desired position of the discharge of the agricultural vehicle relative to the container.

In a possible embodiment the controller is arranged to control the position of the agricultural vehicle such that the discharge of the agricultural vehicle is positioned relative to the container in the desired position determined by the data processing device.

In a possible embodiment the agricultural vehicle is equipped with a moveable unloading tube that comprises the discharge of the agricultural vehicle, wherein the controller is arranged to control the position of said moveable unloading tube such that the discharge of the agricultural vehicle is positioned relative to the container in the desired position determined by the data processing device.

In a possible embodiment the container is moveable, wherein the controller is arranged to control the position of the container such that the discharge of the agricultural vehicle is positioned relative to the container in the desired position determined by the data processing device.

In a possible embodiment the container is part of a vehicle container combination, wherein the controller is arranged to control the position of said vehicle container combination such that the discharge of the agricultural vehicle is positioned relative to the container in the desired position determined by the data processing device.

In a possible embodiment wherein the agricultural vehicle comprises a control system and the controller is integrated in the control system of the agricultural vehicle, such that the control system of the agricultural vehicle is arranged to position the discharge of the agricultural vehicle relative to the container in the desired position determined by the data processing device.

In a possible embodiment the container is moveable and comprises a control system, wherein the controller is integrated in the control system of the container, such that the control system of the container is arranged to position the discharge of the agricultural vehicle relative to the container in the desired position determined by the data processing device.

In a possible embodiment the container is part of a vehicle container combination which comprises a control system, wherein the controller is integrated in the control system of the vehicle container combination, such that the control system of vehicle container combination is arranged to position the discharge of the agricultural vehicle relative to the container in the desired position determined by the data processing device.

In a possible embodiment the controller is arranged to communicate with the data processing device of the unloading automation system via a wired system.

In a possible embodiment the controller is arranged to communicate with the data processing device of the unloading automation system via a wireless system;

In a possible embodiment the data processing device is located on one of the agricultural vehicle and the controller is located on the other of the agricultural vehicle, and the controller is arranged to communicate with the data processing device of the unloading automation system via a vehicle to vehicle (V2V) system.

It is possible for the controller to control multiple parts of the agricultural vehicle and/or the container. For example, the agricultural vehicle may be equipped with a moveable unloading tube that can be controlled by the controller, and the container may be part of a vehicle container combination wherein the position of the container can be controlled by the controller. Therefore, the controller is not required to be defined as one physical device, but can be a combination of physical devices on separate locations, even separate vehicles.

The invention also pertains to a method for unloading crop from an agricultural vehicle into a container, using a system according to any previously mentioned embodiments, wherein the method comprises the following steps:

measuring the level of harvested crop in the container;

measuring the position of the agricultural vehicle relative to the container.

In a possible embodiment the method comprises the following step:

informing the operator regarding the information obtained or computed by the unloading automation system.

In a possible embodiment the method comprises the following step:

determining a desired position of the discharge of the agricultural vehicle relative to the container. In a possible embodiment the method comprises the following steps:

controlling the position of at least a part of at least one of the agricultural vehicle or the container relative to the other of the agricultural vehicle or the container;

positioning the at least a part of at least one of the agricultural vehicle or the container such that the discharge of the agricultural vehicle is positioned relative to the container in the desired position.

BRIEF DESCRIPTION OF THE DRAWINGS

The invention will be described in more detail below under reference to the figures, in which in a non-limiting manner exemplary embodiments of the invention will be shown.

In the figures:

FIG. 5: illustrates how the position of an UWB tag relative to the UWB base stations is determined FIG. 6: illustrates an example of how the amount of UWB base stations 8 can be reduced by limiting the degrees of freedom or using boundary conditions FIG. 7: illustrates an example of how the amount of UWB tags 7 can be reduced by the aid of boundary conditions and/or reducing the degrees of freedom FIG. 8: illustrates how the accuracy of the position measurement system is influenced by the location of the UWB base stations

DETAILED DESCRIPTION OF THE DRAWINGS

Figure 1:
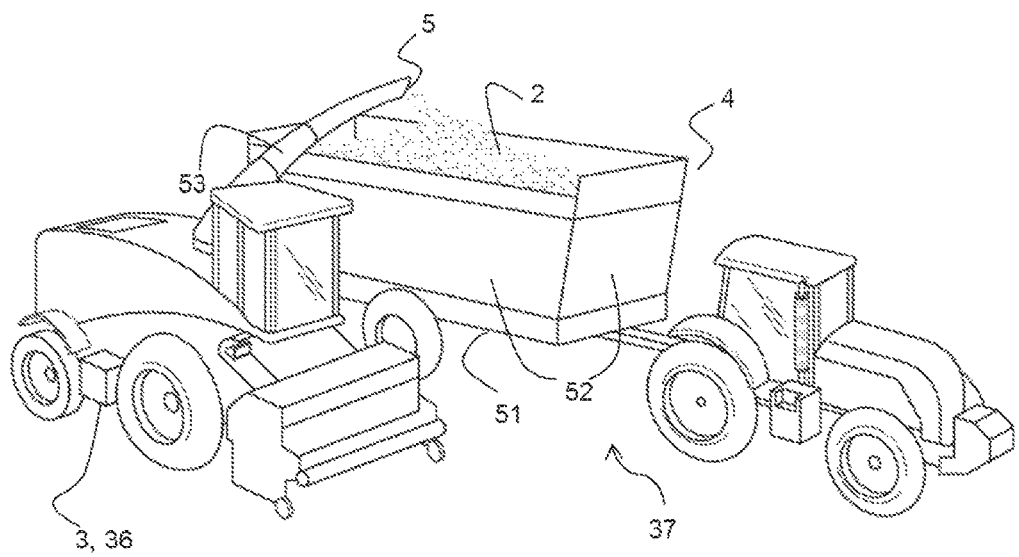
FIG. 1: illustrates an example of an agricultural vehicle and a container

FIG. 1 illustrates an example of an agricultural vehicle 3 and a container 4. In the example of FIG. 1, an agricultural vehicle 3 is shown as a combine harvester 36 and a container 4 as part of vehicle container combination 37. The vehicle container combination 37 can be arranged to maneuver next to the agricultural vehicle 3 in a field, while the agricultural vehicle 3 is harvesting, but this is not necessary for the application of the invention. The agricultural vehicle 3 is arranged to harvest crop in the field. To store the harvested crop 2, the container 4 comprises a bottom 51 and one or multiple walls 52 which extend upwards from the bottom of the container 4. The agricultural vehicle 3 in FIG. 1 is used to harvest crop on a field, and the agricultural vehicle 3 comprises a discharge 5. This discharge 5 is defined as the position where the harvested crop 2 which is to be unloaded leaves the agricultural vehicle 3. In the example of a combine harvester 36, the discharge 5 may be the end of a moveable unloading tube 53.

Figure 2:
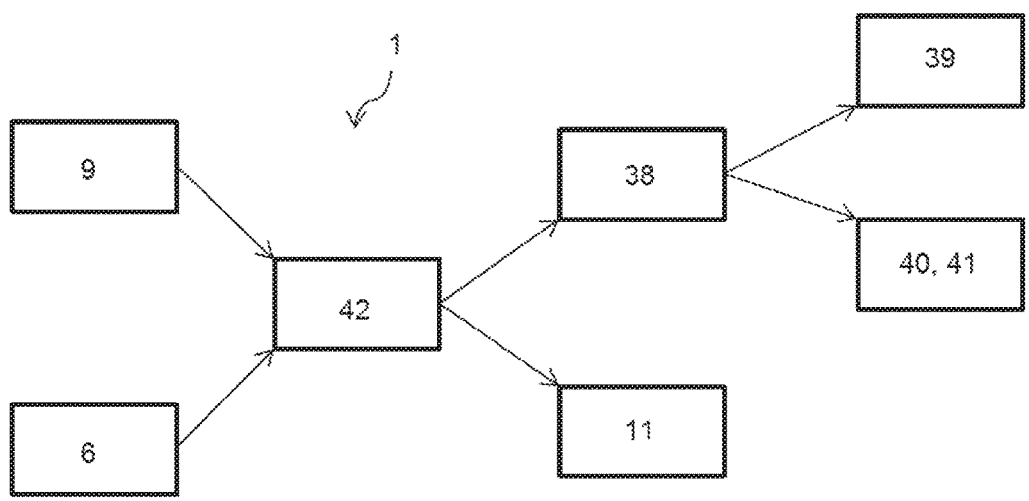
FIG. 2: illustrates a schematic overview of a possible embodiment of an unloading automation system

FIG. 2 illustrates a schematic overview of a possible embodiment of an unloading automation system 1, that is used for unloading harvested crop 2 from an agricultural vehicle 3 into a container 4. The unloading automation system 1 in accordance with the invention comprises a position measurement system 6 and a filling degree measurement system 9.

The position measurement system 6 comprises at least one UWB base station and at least one UWB tag, and is adapted to determine the position of the agricultural vehicle 3 relative to the container 4 based on UWB technology. The information obtained by the position measurement system 6 is used to position the discharge 5 of the agricultural vehicle 3 relative to the container 4, in order to minimize the loss of harvested crop 2 which could occur when the unloading of the harvested crop 2 next to the container 4. Furthermore, the information obtained by the position measurement system 6 can be used to avoid clashes between the agricultural vehicle 3 and the container 4. UWB technology is a suitable technology since it is non-optical, hence it is not influenced by possible dust. Furthermore higher accuracy can be reached with UWB technology in comparison to passive or active RFID. Adapting existing containers 4 to be suitable for the unloading automation system 1 in accordance with the invention can be done at relatively low cost, since the only necessary modification is to equip the containers 4 with UWB-tags/UWB base stations.

The filling degree measurement system 9 is arranged to determine the level of harvested crop 2 at least at one position within the container 4. When the level of harvested crop 2 in the container 4 reaches a predetermined level, the unloading of harvested crop 2 into the container 4 can be stopped in order minimize loss of harvested crop 2 which could occur when the container 4 is overfilled. In a possible embodiment the filling degree measurement system 9 is arranged to determine the level of harvested crop 2 on more than one position within the container 4. In this embodiment, when the level of harvested crop 2 in the container 4 reaches a predetermined level on a certain position in the container 4, it may be possible to further fill the container 4 on another position in the container 4.

In a possible embodiment, the unloading automation system 1 comprises a data processing device 42, which can arranged to determine at least a desired position of the discharge 5 of the agricultural vehicle 3 relative to the container 4 based on the measurements obtained by at least one of the position measurement system 6 and the filling degree measurement system 9. A desired position is a position in which loss of harvested crop 2 due to for example unloading next to the container 4 or overfill of the container 4 is minimized. By determining a desired position of the discharge 5 of the agricultural vehicle 3, the data processing device takes over this responsibility from the operator, hence simplifying the work of the operator.

In a possible embodiment, the unloading automation system 1 comprises an information system 38, wherein the information system 38 is arranged to inform the operator regarding the information obtained or computed by the unloading automation system 1. Using the information provided by the information system 38, the operator is able to maneuver the position of the discharge 5 of the agricultural vehicle 3 relative to the container 4, in order to successfully unload the harvested crop 2 into the container 4. The operator is no longer required to monitor the position of the container 4 relative to the agricultural vehicle 3 himself, nor is he required to monitor the level of harvested crop 2 in the container 4.

In a possible embodiment, the information system 38 comprises a visual display 39 on which information obtained or computed by the unloading automation system 1 is shown to the operator.

In a possible embodiment, the information system 38 is arranged to produce alarms 40 and/or instructions 41 to the operator, wherein said alarms 40 and/or instructions 41 are communicated to the operator visually and/or by sound.

In a possible embodiment, the unloading automation system 1 comprises a controller 11, which can be arranged to communicate either wired or wireless with the data processing device of the unloading automation system 1. This controller 11 is arranged to move at least a part of at least one of the agricultural vehicle 3 or the container 4. This may be for example an unloading tube 53 of the agricultural vehicle 3, the container 4 and/or the vehicle container combination 37 which the container 4 may be part of. The function of the controller 11 is to arrange the discharge 5 of the agricultural vehicle 3 to be located on the desired position, that is determined by the data processing device 42 of the unloading automation system 1. By arranging the discharge 5 of the agricultural vehicle 3 to be in the desired position, the controller 11 takes over this responsibility from the operator, hence simplifying the work of the operator.

Figure 3:
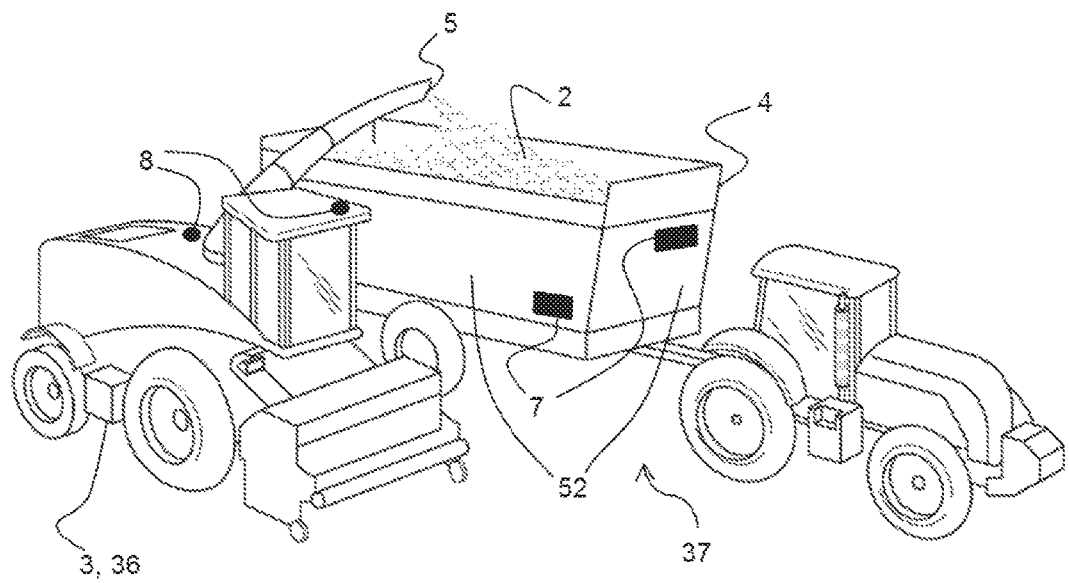
FIG. 3: illustrates a possible embodiment of the position measurement system

In FIG. 3 a possible embodiment of the position measurement system 6 is shown. The position measurement system 6 comprises at least one UWB tag 7 and at least one UWB base station 8. The UWB tag 7 is fixed in a known position relative to one of the agricultural vehicle 3 or container 4, for example a wall of the container 4, and the UWB base station 8 is fixed in a known position relative to the other one of the agricultural vehicle 3 or container 4, for example on the agricultural vehicle 3. In a possible embodiment as shown in FIG. 6, two UWB base stations 8 are located on the agricultural vehicle 3, and two UWB tags 7 are located on the walls 52 of the container 4. In the example of FIG. 6 the UWB base stations 8 are located on the top of the agricultural vehicle 3, but they can also be located on the wall of the agricultural vehicle 3 that is facing the container 4. It is also possible to, for example, locate the UWB base station 8 on a wall of the container 4 and the UWB tag 7 on the agricultural vehicle 3.

Figure 4:
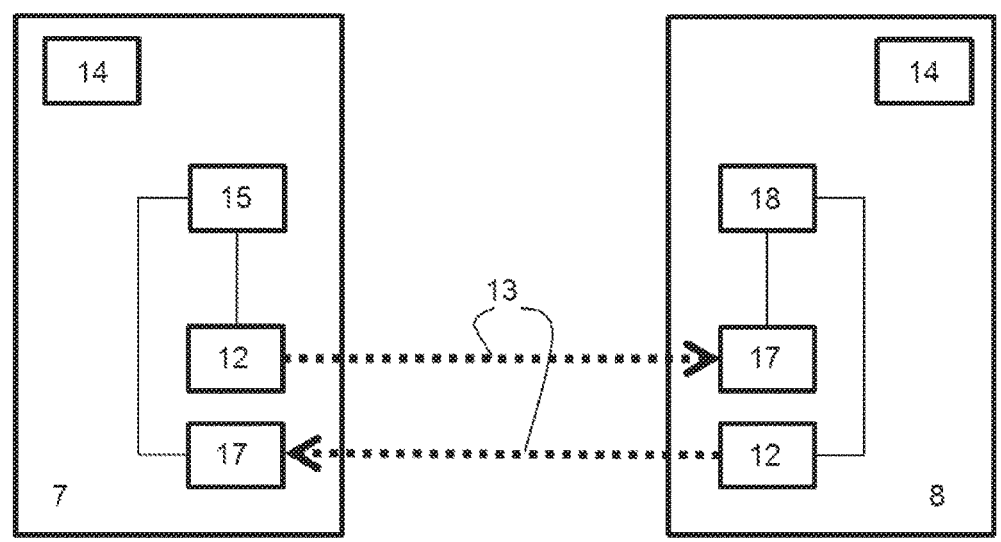
FIG. 4: illustrates a possible embodiment of the UWB tag and the UWB base station

FIG. 4 illustrates a possible embodiment of the UWB tag 7 and the UWB base station 8. The UWB tag 7 and UWB base station 8 are arranged to communicate with each other via UWB pulses 13. The UWB tag 7 comprises an UWB radio transmitter 12 designed to transmit the UWB pulses 13 in combination with a unique identification code, such that the UWB tag 7 can be identified. The UWB radio transmitter 12 is controlled by a microcontroller 15. The UWB base station 8 comprises an UWB radio receiver 17 which is designed to receive the UWB pulses 13 transmitted by the UWB radio transmitter 12 of the UWB tag 7. Operation of the UWB radio receiver 17 is controlled by a microcontroller 18, which is arranged to process the UWB pulses received by the UWB radio receiver 17 as well, to determine the distance of the UWB tag to the UWB base station. The distance of the UWB tag 7 to the UWB base station 8 may, for example, be determined by the microcontroller 18 based on the basis of one or more of the following techniques: time difference of arrival (TDOA), angle of arrival (AOA), time of arrival (TOA) or two way ranging (TWR).

In a preferred embodiment both the UWB base station 8 and the UWB tag 7 are equipped with an UWB radio transmitter 12 and an UWB radio receiver 17. In this embodiment the UWB base station 8 emits an UWB pulse 13, which is received by the UWB tag 7. After receiving the UWB pulse 13, the UWB tag 7 immediately sends back an UWB pulse 13 to the UWB base station 8. The distance between the UWB base station 8 and the UWB tag 7 can be determined from the time of flight, i.e. the time the UWB pulses 13 have travelled.

Since a small delay in the returning of the UWB pulse 13 by the UWB tag 7 can lead to considerable inaccuracy in the determination of the distance between the UWB tag 7 and the UWB base station 8, it is desirable to incorporate a way to determine said delay. One possible way of doing this, is to arrange the UWB tag 7 to send back two UWB pulses 13. The first UWB pulse 13 will be send at the moment the UWB pulse 13 that was emitted by the UWB base station 8 is received. Because of the processing time of the microcontroller 15 and UWB radio transmitter 12 however, a certain delay will occur. As soon as the signal is transmitted, the UWB tag 7 will transmit a second UWB pulse 13, which will be delayed by the same amount of time. So, the UWB base station 8 receives two UWB pulses 13 with a certain time difference. This time difference is equal to the delay in the UWB tag 7. By determining this delay, it can be subtracted from the time between the sending and receiving of the UWB pulse 13 by the UWB base station 8. The result from that subtraction is the actual time that the UWB pulse 13 travelled to the UWB tag 7 and back. Since the speed of travelling is known, the distance between the UWB base station 8 en the UWB tag 7 can now be determined.

Additionally, both the UWB tag 7 and the UWB base station 8 comprise an electric energy source 14, which may be either electrically supplied from the outside, for example by the vehicle battery of the agricultural vehicle 3 or a vehicle container combination 37, or for example a battery.

Since the UWB tag 7 is fixed on a known position relative to one of the agricultural vehicle or the container 4 and the UWB base station 8 is fixed on a known position relative to the other of the agricultural vehicle 3 or the container 4, the position of the agricultural vehicle 3 relative to the container 4 can be retrieved by the distance of the UWB tag 7 relative to the UWB base station 8. To clarify how the position of the agricultural vehicle 3 relative to the container 4 is obtained, a possible general method for locating an UWB tag 7 is explained step by step below with respect to FIG. 5.

In FIG. 5*a*, a first UWB base station 8*a* is provided. From the communication between the first UWB base station 8*a* and an UWB tag 7, of which the exact position is to be found, the distance between the UWB tag 7 and the first UWB base station 8*a* can be retrieved, for example by the method explained above. Every point in the three dimensional coordinate system on that distance of the first UWB base station 8*a* is a potential position of the UWB tag 7. This results in a first sphere 49*a* with a periphery of potential positions in the three dimensional coordinate system of the UWB tag 7, wherein the distance between the first UWB base station 8*a* and the UWB tag 7 is the radius of the sphere. In FIG. 5*a*, the sphere is shown as seen from top view.

In FIG. 5*b* a second UWB base station 8*b* is provided on a predetermined position relative to the first UWB base station 8*a*. The distance between the UWB tag 7 and the second UWB base station 8*b* can be retrieved, resulting in a second sphere 49*b* with a periphery of potential positions of the UWB tag 7 in the three dimensional coordinate system. Since the position of the first UWB tag 7 is known to be on the peripheries of both the first sphere 49*a* and the second sphere 49*b*, the intersections between the first and second sphere are the remaining potential positions of the UWB tag 7. These intersections result in a circle 50 with a periphery of potential positions of the UWB tag 7, which in FIG. 5*b* is shown as an oval because it is seen from top view.

Providing a third UWB base station 8*c* on a predetermined position in FIG. 5*c* results in a third sphere with a periphery of potential positions of the UWB tag 7, wherein the third sphere intersects with the circle 50 on two positions 54*a*, 54*b*, which are the remaining potential positions of the UWB tag.

Providing a fourth UWB base station 8*d* on a predetermined position in FIG. 5*d* results in a fourth sphere 49*d* with a periphery of potential positions of the UWB tag 7, wherein the fourth sphere intersects with the first sphere 49*a*, second sphere 49*b* and third sphere 49*c* on exactly one position 54*a*, indicated with the arrow in FIG. 5*d*. This is the position of the first UWB tag 7. In general, to locate a certain point in a three dimensional coordinate system by using only UWB base stations and an UWB tag, the distances of said point to four other points, of which the coordinates are known, are required.

If, for example, the UWB base stations 8*a*,8*b*,8*c*,8*d* are placed on the agricultural vehicle 3 and the UWB tag 7 is placed on the wall of the container 4, the position of the UWB tag 7 relative to the agricultural vehicle 3 can be obtained by the method explained with respect to FIG. 5. In order to locate the discharge 5 of the agricultural vehicle 3 correctly, the shape of the container 4 should be known, such that the unloaded harvested crop 2 is unloaded in between of the walls of the container 4 instead of for example next to the container 4. Therefore the position of all points of the container 4 should be determined. Since the shape of the container 4 is rigid and predetermined, the distance of each point of the container 4 to the first UWB tag 7 is predetermined. As shown by the method explained with respect to FIG. 5, to locate a certain point in a three dimensional coordinate system, the distance of said point to four other points, of which the coordinates are known, is required. Hence the positions of all points of the container 4 can be determined when the positions of four points of the container 4 are known, which can be achieved for example by placing four UWB tags 7 on a position known and fixed relative to the container 4.

FIG. 6 illustrates an example of how the amount of UWB base stations 8 can be reduced by limiting the degrees of freedom or using boundary conditions. In FIG. 6 the agricultural vehicle 3 and the container 4 are both shown in top view as a simplified rectangle. In this example the UWB base stations 8 are located on the agricultural vehicle 3 and an UWB tag 7, of which the position is to be found, is located on a wall of the container 4, in FIG. 6 the left sided wall.

If the position of the agricultural vehicle 3 relative to the container 4 can vary in all three dimensions of a three dimensional coordinate system, the number degrees of freedom is said to be three. However in FIG. 6, the height of the agricultural vehicle 3 relative to the container 4 is known beforehand, hence the amount of degrees of freedom is reduced to two. As such the first sphere 49a with a periphery of potential positions in the three dimensional coordinate system of the UWB tag 7 obtained by the distance of the UWB tag 7 to the first UWB base station 8a, can be reduced to a first circle 50a with a periphery of potential positions of the first UWB tag 7, since the points of the first sphere 49a that are located at height different than the known height can be excluded as potential positions of the UWB tag 7.

In FIG. 6b a second UWB base station 8b is provided. Similarly, the second sphere 49b with a periphery of potential positions of the UWB tag 7, obtained by the distance between the UWB tag 7 and the second UWB base station 8b, can be reduced to a second circle 50b. The second circle 50b has two intersections 54a, 54b with the first circle 50a.

In FIG. 6c a third UWB base station 8c is provided. Similarly, the third sphere 49c with a periphery of potential positions of the UWB tag 7, obtained by the distance between the UWB tag 7 and the third UWB base station 8c, can be reduced to a third circle 50c. The first circle 50a, the second circle 50b and the third circle 50c intersect at exactly one position 54a, which is the position of the UWB tag 7. Hence, the fourth UWB base station 8d is no longer required to determine the exact position of the UWB tag 7. By reducing the number of degrees freedoms by a certain amount, the number of required UWB base stations 8 is decreased by the same amount.

The amount of UWB base stations 8 may also be reduced by the aid of boundary conditions. Boundary conditions are defined as predetermined relations between certain points. For example, the container 4 can be located on one predetermined side of the agricultural vehicle 3, which in FIG. 6 is the right handed side. The UWB base stations 8a,8b,8c and UWB tag 7 can be placed on positions such that half the points on the sphere obtained by the distance between the UWB base station 8a and an UWB tag 7 fall on the other side of the UWB base station 8a than the predetermined side the container 4 is located on relative to the agricultural vehicle 3, and as such can be eliminated as potential positions of the UWB tag 7.

In FIG. 6a, the degrees of freedom has already been reduced to two, resulting in a first circle 50a with a periphery of potential positions of the UWB tag 7 rather then a sphere 49a. Since the container 4 is known to be on the right hand side of the agricultural vehicle 3 in FIG. 6a, all points of the first circle 50a that located of the left hand side of the first UWB base station 8a, can be eliminated as potential positions for the UWB tag 7. In FIG. 6b, the second circle 50b, obtained by the distance between the UWB tag 7 and the second UWB base station 8b, intersects with the first circle 50a in two points 54a, 54b. Since all points located on the left hand side of the first UWB base station 8a can be eliminated as potential positions of the UWB tag 7, point 54b can be eliminated as a potential position of the UWB tag 7. As such only one point 54a remains as a potential position of the UWB tag 7, hence being the position of the UWB tag 7. As can be seen, the third UWB base station 8c provided in FIG. 6c is no longer required to determine to position of the UWB tag.

FIG. 7 illustrates an example of how the amount of UWB tags 7 can be reduced by the aid of boundary conditions and/or reducing the degrees of freedom as well. In this example, the UWB tags 7 are placed on the walls of the container 4 and used to locate the container 4, which comprises a bottom 51 and four walls 52 that extend from the bottom up and wherein adjacent walls are perpendicular to each other. A first UWB tag 7a is located on a predetermined position on a wall of the container 4. When the position of the first UWB tag 7a as determined by the method described above, the position of the rest of the container 4 is still undetermined. Any position of the container 4 wherein the first UWB tag 7a remains in the determined position, is a potential position of the container 4. All potential positions of the container 4 result as it where from rotating the container 4 around the position of the first UWB tag 7a. In FIG. 7a the actual position of the container 4 is shown in full lines, while in dashed lines two of the infinite amount of potential positions of the container 4 when one UWB tag 7a is located are shown.

In FIG. 7b a second UWB tag 7b is provided, as well on a wall of the container 4. By determining the position of the second UWB tag 7b, the potential positions of the rest of the container 4 can be limited as follows. An imaginary line 55 can be drawn between the first UWB tag 7a and the second UWB tag 7b. In this example, because the UWB tags 7a,7b are located on two bottom corners of the container 4, the imaginary line 55 coincides with the intersection of one of the walls 52 and the bottom 51. Since the shape of the container 4 is known and rigid, the distance of each point of the container 4 to the first UWB tag 7a and to the second UWB tag 7b is known, forming a set of boundary conditions. For each point of the container 4, a circle with a periphery of potential positions for said point could be drawn, wherein the centerpoint of that circle is on the imaginary line between the first UWB tag 7a and second UWB tag 7b and the radius of the circle is perpendicular to the imaginary line 55. The potential positions of the complete container 4 result as it where from rotating the container 4 around the imaginary line 55 between the first UWB tag 7a and second UWB tag 7b. In FIG. 7b four potential positions of the container 4 are shown, wherein the actual position in drawn in full lines. In FIG. 7c the potential positions of the container 4 have been limited to two by, for example, assuming that the bottom of the container 4 is horizontal, and the four corners are on the same height, such that the amount of degrees of freedom of the other points of the container 4 relative to the UWB tags 7a,7b is limited to two. It is also possible to define a predetermined relation in the height of all points of the container 4 relative to the UWB tags 7a,7b as a boundary condition. Both implementations reduce the potential positions of the container 4 to two.

In one of the two remaining potential positions, the container 4 is turned upside down, as is shown is FIG. 7c in dashed lines. This position can be excluded since the this is not a realistic situation. As such the last remaining potential position, shown in FIG. 7d, is defined as the position of the container 4, which in this example is determined by using only two UWB tags 7a,7b.

FIG. 8 illustrates how the accuracy of the position measurement system 6 is influenced by the location of the UWB base stations 8. FIG. 8a illustrates two UWB base station 8a, 8b located relatively close to each other, and an UWB tag 7 whose position is determined by the UWB base stations 8a, 8b. For simplicity reasons, it is assumed in this example that the amount of degrees of freedom and the boundary conditions allows for two UWB base stations 8 and the corresponding circles to be sufficient to locate the UWB tag 7. In FIG. 8a, the position of the UWB tag 7 is determined by the intersection of the two circles 50a, 50b obtained by the distance between the UWB base stations 8a, 8b and the UWB tag 7. Due to inaccuracies in the measurements however, it is possible that the measured distance differs slightly from the actual distance. In FIG. 8b, a relatively small inaccuracy has been assumed in the measurement of the distance between the second UWB base station 8b and the UWB tag 7, resulting in the dashed second circle 50b'. As can be seen, the intersection of the first circle 50a and second circle 50b', and hence the assumed position of the UWB tag 7, is located relatively far from the intersection of the first circle 50a and the second circle 50b in FIG. 8a.

In FIG. 8c, the second UWB base station 8b is located on an equal distance from the UWB tag 7 as in FIG. 8a, however not as close to the first UWB base station 8a as in FIG. 8a. In FIG. 8d, the inaccuracy in the measurement of the distance between the second UWB base station 8b and the UWB tag 7 is equal to the inaccuracy in FIG. 8b. The inaccuracy in the determination of the position of the UWB tag 7 however, is much smaller than in FIG. 8b. In order to increase accuracy, it is desirable to position UWB base stations 8a,8b on sufficient distance relative to each other. Since the distance between an UWB base station 8 and an UWB tag 7 result in a sphere 49 or circle 50 with a periphery of potential positions of the UWB tag 7, of which the UWB base station 8 is the centerpoint, the respective spheres 49 or circles 50 obtained by two UWB base stations 8 will be more similar if the UWB base stations 8 are positioned close to each other. In this case, a small inaccuracy in the measurement can lead to a bigger inaccuracy in the determination of the intersecting points, and hence the determinations of the position of the UWB tag 7.

In order to increase the accuracy of the obtained position of the UWB tag 7, the amount of UWB base stations 8 can be increased. If for example five UWB base stations 8 are used, five spheres with a periphery of potential positions for an UWB tag 7 can be obtained. Theoretically the five spheres should all intersect at one point, being the position of the UWB tag 7. Due to inaccuracy in the measurements however, it is likely that the five spheres will not intersect at exactly one specific point, but rather they will all approach the position of the UWB tag 7 within the range of the accuracy of the measurement. With five UWB base stations 8, the position measurement system 6 can then be arranged to neglect an outlier, whereas in a situation with only four UWB base stations 8, this outliner would considerably influence the accuracy of the measurement. It is clear to the person skilled in the art that more UWB base stations 8 will result in higher accuracy.

Figure 9:
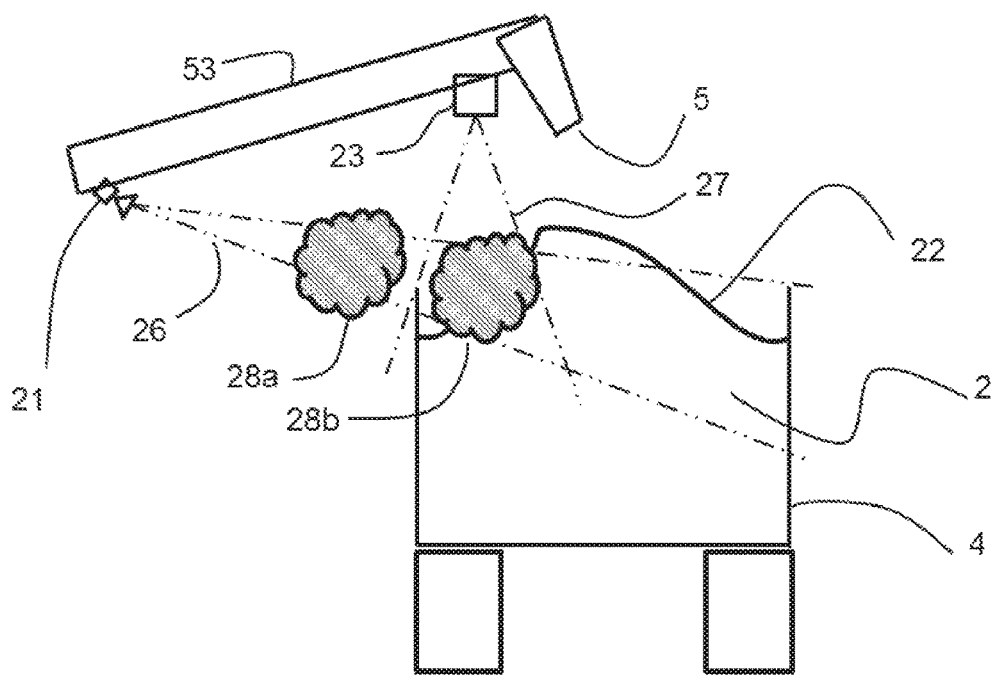
FIG. 9: illustrates a possible embodiment of the filling degree measurement system comprising a 3D-camera

In FIG. 9 a possible embodiment of the filling degree measurement system 9 comprising a 3D-camera 21 is shown. In this example the agricultural vehicle 3, which is not shown in its entirely, comprises an unloading tube 53 which comprises the discharge 5. The 3D-camera 21, which is located on the unloading tube, is arranged to scan the inside of the container 4. The filling degree measurement system 9 further comprises a source of illumination 23, which is located on another position and under another angle than the 3D-camera 21. The cone-like field of view 26 of the 3D-camera 21 and the cone-like field of view 27 of the illumination 23 coincide in the container 4 on the position of the to be measured harvested crop 2. This implementation is particularly beneficial in dusty environments, since the dust 28a in the vicinity of the camera is not illuminated, and as such not seen by the camera. Although the dust 28b in the container 4 is still seen by the camera, tests have shown that this dust 28b is less influential on the pixels obtained by the camera resulting overall in more stable crop pixels. The results of the scan provide the distance of the top of the harvested crop 2 with respect to the 3D-camera 21, from which the level 22 of crop 2 in the container 4 can be determined.

Figure 10:
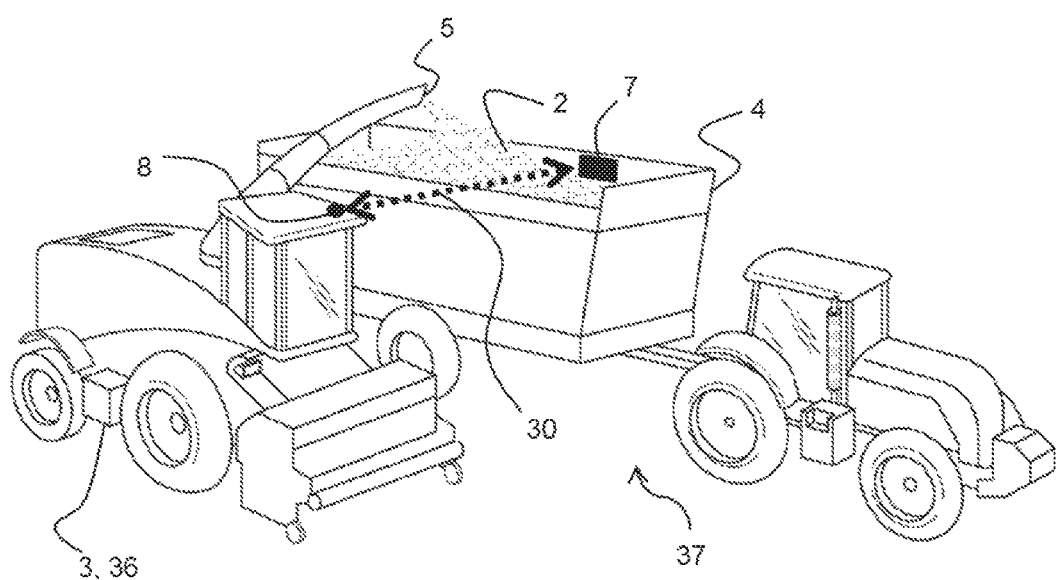
FIG. 10: illustrates a possible embodiment of the filling degree measurement system comprising an UWB tag

In FIG. 10 a possible embodiment of the filling degree measurement system 9 comprising an UWB tag 7 is shown. In this embodiment the filling degree measurement system 9 comprises at an UWB tag 7, which is arranged to communicate with an UWB base station 8 via a wireless communication path, for example by the method explained above. The UWB tag 7 and the UWB base station 8 are positioned such that their wireless communication path gets distorted as the container 4 is filled, resulting in a weakened UWB pulse received by the UWB base station 8. In this example, the UWB tag 7 is located on the inside of the container 4. As the level 22 of harvested crop 2 in the container 4 rises, the harvested crop 2 will cover the UWB tag 7 at a certain level, resulting in a weaker UWB pulse from the UWB tag 7 to the UWB base stations 8, and as such the filling degree measurement system 9 can detect that the level 22 of harvested crop 2 at the position of the UWB tag 7 exceeded the height of the UWB tag 7. In a further embodiment, it is possible for the filling degree measurement system 9 to be arranged to monitor multiple positions within a container 4, and as such an overview of the level 22 of harvested crop 2 in the container 4 can be obtained.

Figure 11:
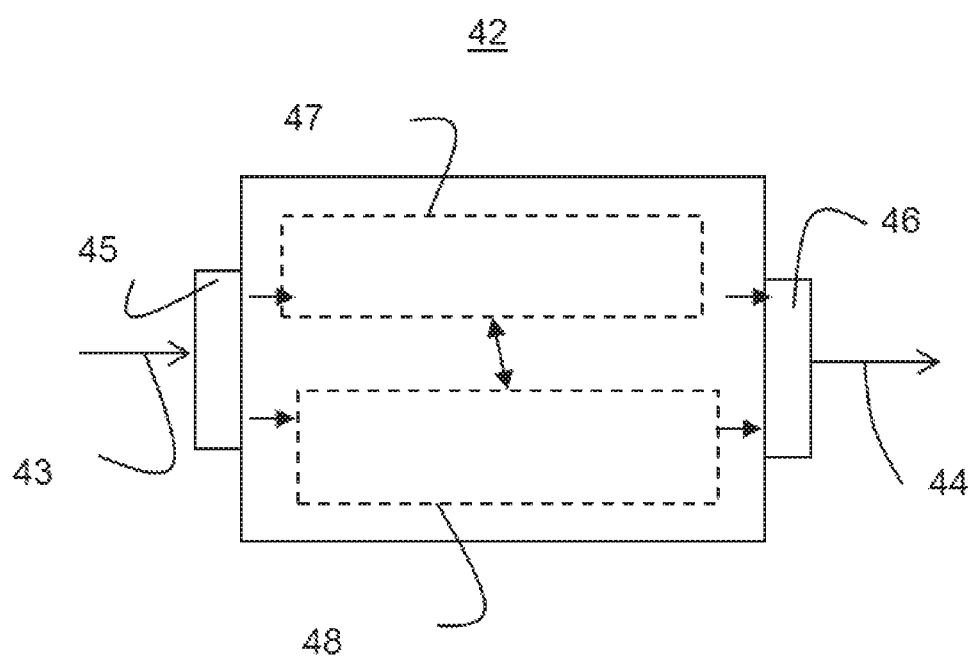
FIG. 11: schematically illustrates a possible embodiment of the data processing device

FIG. 11 schematically illustrates a possible embodiment of the data processing device 42. Such a data processing device 42 may be applied as a stand-alone tool or may be incorporated for example in filling degree measurement system 9, the position measurement system 6 or a data processing device that is comprised by the agricultural vehicle 3, container 4 or vehicle container combination 37.

The data processing device 42 as schematically shown in FIG. 6 comprises an input terminal 45 for receiving input data 43, which can be for example the signals or measurements obtained by the filling degree measurement system and/or the position measurement system. The input data 43 as received may be provided to a processor 47 of the data processing device 42. Such a processor 47 may e.g. be a microprocessor, a computer or the like for processing data such as the input data 43 as received. In the embodiment as shown, the processing system further comprises a memory 48 or memory unit for storing data such as the received input data or for storing computational results of the processing by the processor 47. As such, the memory 48 may e.g. serve as a database for storing the previously obtained measurements, for example to obtain an overview of the level 22 of harvested crop 2 in the container 4. In the embodiment as shown, the data processing device 42 further comprises an output terminal 46 for outputting an output data 44, which can be for example the desired position of the discharge 5 or data that is intended as input for the information system.

The invention claimed is:

1. An unloading automation system for unloading harvested crop from an agricultural vehicle into a container, wherein the agricultural vehicle is equipped with a discharge, the unloading automation system comprising:
a filling degree measurement system adapted to, during the unloading, determine a level of harvested crop at at least one position within the container, the filling degree measurement system comprising at least one first ultra wideband tag and at least one first ultra wideband base station, wherein the at least one first ultra wideband tag is arranged to communicate with the at least one first ultra wideband base station via a wireless communication path, wherein the at least one first ultra wideband tag and the at least one first ultra wideband base station are positioned such that their wireless communication path gets distorted as the container is filled, resulting in a weakened ultra wideband pulse received by the at least one first ultra wideband base station;
a position measurement system adapted to determine a position of the agricultural vehicle relative to the container, the position measurement system comprising at least one second ultra wideband tag and at least one second ultra wideband base station, wherein the at least one second ultra wideband tag is adapted to generate a ultra wideband pulse and arranged to communicate with the at least one second ultra wideband base station, wherein the at least one second ultra wideband tag is fixed in a known position relative to one of the agricultural harvester or the container and the at least one second ultra wideband base station is fixed in a known position relative to the Other of the agricultural harvester or the container, wherein the position measurement system is further adapted to:
obtain a distance of the at least one second ultra wideband tag to the at least one second ultra wideband base station from a communication between the at least one second ultra wideband tag and the at least one second ultra wideband base station; and
obtain a position of the agricultural vehicle relative to the container from the distance of the at least one second ultra wideband tag to the at least one second ultra wideband base station,
wherein at least one of the ultra wideband base stations or ultra wideband tags is a common ultra wideband base station or a common ultra wideband tag that is in the filing degree measurement system as well as in the position measurement system, and
wherein the filling degree measurement system and the position measurement system are adapted to respectively determine the position of the agricultural vehicle relative to the container and the level of the harvested crop at the at least one position within the container based on an ultra wideband pulse which is received or transmitted by the common ultra wideband base station or the common ultra wideband tag.

2. The system according to claim 1, wherein
each of the at least first and second ultra wideband tags comprises a first ultra wideband radio receiver designed to receive ultra wideband pulses, a first ultra wideband radio transmitter designed to transmit ultra wideband pulses, an electric energy source, and a microcontroller programmed to control operation of the first ultra wideband radio transmitter and the first ultra wideband radio receiver, and wherein the each ultra wideband tag is adapted to store a unique identification code and transmit the unique identification code together with the ultra wideband pulses to allow the each ultra wideband tag to be identified,
each of the at least first and second base stations comprises a second ultra wideband radio receiver designed to receive ultra wideband pulses, a second ultra wideband radio transmitter designed to transmit ultra wideband pulses, an electric energy source, and a microcontroller programmed to control operation of the second ultra wideband radio transmitter and the second ultra wideband radio receiver, and
wherein each of the at least first and second ultra wideband tags is arranged to return an ultra-wideband pulse that is emitted by a respective one of the at least first and second ultra wideband base stations, and wherein the distance between the respective ultra wideband base station and the each ultra wideband tag is determined by the time the ultra wideband pulse has travelled from the respective ultra wideband base station to the each ultra wideband tag and back.

3. The system according to claim 1, wherein the filling degree measurement system further comprises a 3D-camera at a known position relative to the agricultural vehicle, wherein the 3D-camera is arranged to scan the inside of the container, and wherein the filling degree measurement system is further adapted to determine the level of harvested crop in the container from results of the scan.

4. The system according to claim 3, wherein the filling degree measurement system further comprises a source of illumination, wherein the source of illumination is positioned separately from the 3D-camera, resulting in fields of view of the 3D-camera and illumination which are dissimilar to each other, wherein the respective fields of view coincide in the container on the position of crop to be measured.

5. The system according to claim 1, wherein the unloading automation system comprises a data processing device, wherein the data processing device comprises at least one input terminal and at least one output terminal, and further comprises a processor which is adapted to compute output data based on input data.

6. The system according to claim 5, wherein the data processing device is arranged to determine at least a desired position of the discharge of the agricultural vehicle relative to the container based on the measurements obtained by at least one of the position measurement system and the filling degree measurement system.

7. The system according to claim 1, further comprising an information system arranged to inform an operator of the agricultural vehicle regarding information obtained or computed by the unloading automation system.

8. The system according to claim 7, wherein the information system comprises a visual display on which the information obtained or computed by the unloading automation system is shown to the operator, wherein the information system is arranged to produce alarms and instructions to the operator, and wherein the alarms and instruction are communicated to the operator visually or by sound.

9. The system according to claim 7, wherein the information system is arranged to inform the operator regarding a desired position of discharge of the agricultural vehicle relative to the container.

10. The system according to claim 5, wherein the unloading automation system further comprises a controller configured control a position of at least a part of at least one of the agricultural vehicle or the container relative to the other of the agricultural vehicle or the container, wherein the controller is further configured to communicate with the data processing device of the unloading automation system, and wherein the controller further configured to position the at least a part of at least one of the agricultural vehicle or the container such that the discharge of the agricultural vehicle is positioned relative to the container in a desired position determined by the data processing device.

11. The system of claim 1, wherein the system is integrated with the agricultural vehicle and the container and the agricultural vehicle is a combine harvester.

12. A method for unloading crop from an agricultural vehicle into a container, using an unloading automation system for unloading harvested crop into a container, the unloading automation system comprising: a filling degree measurement system adapted to, during the unloading, determine a level of harvested crop at at least one position within the container, the filling degree measurement system comprising at least one first ultra wideband tag and at least one first ultra wideband base station, wherein the at least one first ultra wideband tag is arranged to communicate with the at least one first ultra wideband base station via a wireless communication path, wherein the at least one first ultra wideband tag and the at least one first ultra wideband base station are positioned such that their wireless communication path gets distorted as the container is filled, resulting in a weakened ultra wideband pulse received by the at least one first ultra wideband base station; a position measurement system adapted to determine a position of the agricultural vehicle relative to the container, the position measurement system comprising at least one second ultra wideband tag and at least one second ultra wideband base station, wherein the at least one second ultra wideband tag is adapted to generate a ultra wideband pulse and arranged to communicate with the at least one second ultra wideband base station, wherein the at least one second ultra wideband tag is fixed in a known position relative to one of the agricultural harvester or the container and the at least one second ultra wideband base station is fixed in a known position relative to the other of the agricultural harvester or the container, wherein the position measurement system is further adapted to: obtain a distance of the at least one second ultra wideband tag to the at least one second ultra wideband base station from a communication between the at least one second ultra wideband tag and the at least one second ultra wideband base station; and obtain a position of the agricultural vehicle relative to the container from the distance of the at least one second ultra wideband tag to the at least one second ultra wideband base station; wherein at least one of the ultra wideband base stations or ultra wideband tags is a common ultra wideband base station or a common ultra wideband tag that is in the filing degree measurement system as well as in the position measurement system; and wherein the filling degree measurement system and the position measurement system are adapted to respectively determine the position of the agricultural vehicle relative to the container and the level of the harvested crop at the at least one position within the container based on an ultra wideband pulse which is received or transmitted by the common ultra wideband base station or the common ultra wideband tag;

the method comprising the steps of:
measuring the level of harvested crop at the at least one position within the container; and
measuring the position of the agricultural vehicle relative to the container.

13. The system to claim 1, wherein the position measurement system further comprises a third ultra wideband tag and a third ultra wideband base station.

* * * * *